United States Patent [19]

Porter

[11] Patent Number: 4,777,801
[45] Date of Patent: Oct. 18, 1988

[54] ENERGY CONVERSION APPARATUS

[76] Inventor: David R. Porter, 2160 E. Greenway Dr., Tempe, Ariz. 85282

[21] Appl. No.: 73,058

[22] Filed: Jul. 13, 1987

[51] Int. Cl.⁴ .................................................. F02B 71/04
[52] U.S. Cl. ....................................... 60/595; 417/380
[58] Field of Search .............. 60/595; 123/1 A, 46 R, 123/DIG. 12; 417/364, 380, 392

[56] References Cited

U.S. PATENT DOCUMENTS

| | | | |
|---|---|---|---|
| 1,093,280 | 4/1914 | Ludwig | 415/202 |
| 3,106,896 | 10/1963 | Van Der Lely et al. | 60/595 X |
| 3,119,230 | 1/1964 | Kosoff | 60/595 |
| 3,608,529 | 9/1971 | Smith et al. | 123/25.2 |
| 3,757,515 | 9/1973 | Pais | 60/595 |
| 3,848,415 | 11/1974 | Demetrescu | 60/595 |
| 3,946,711 | 3/1976 | Wigal | 123/119 E |
| 4,086,878 | 5/1978 | Eisele et al. | 123/1 A |
| 4,140,090 | 2/1979 | Lindberg | 123/75 B |
| 4,428,198 | 1/1984 | Sutter | 60/595 |

Primary Examiner—Stephen F. Husar

[57] ABSTRACT

A two-stage energy conversion apparatus operating on a nonpolluting fuel. A single-cylinder reciprocating engine converts combustion energy to mechanical energy. Mechanical energy developed in the reciprocating engine is transmitted or coupled to a turbine by means of a transmission fluid flowing in a closed loop system interconnecting the reciprocating engine and the turbine.

4 Claims, 1 Drawing Sheet

U.S. Patent    Oct. 18, 1988    4,777,801
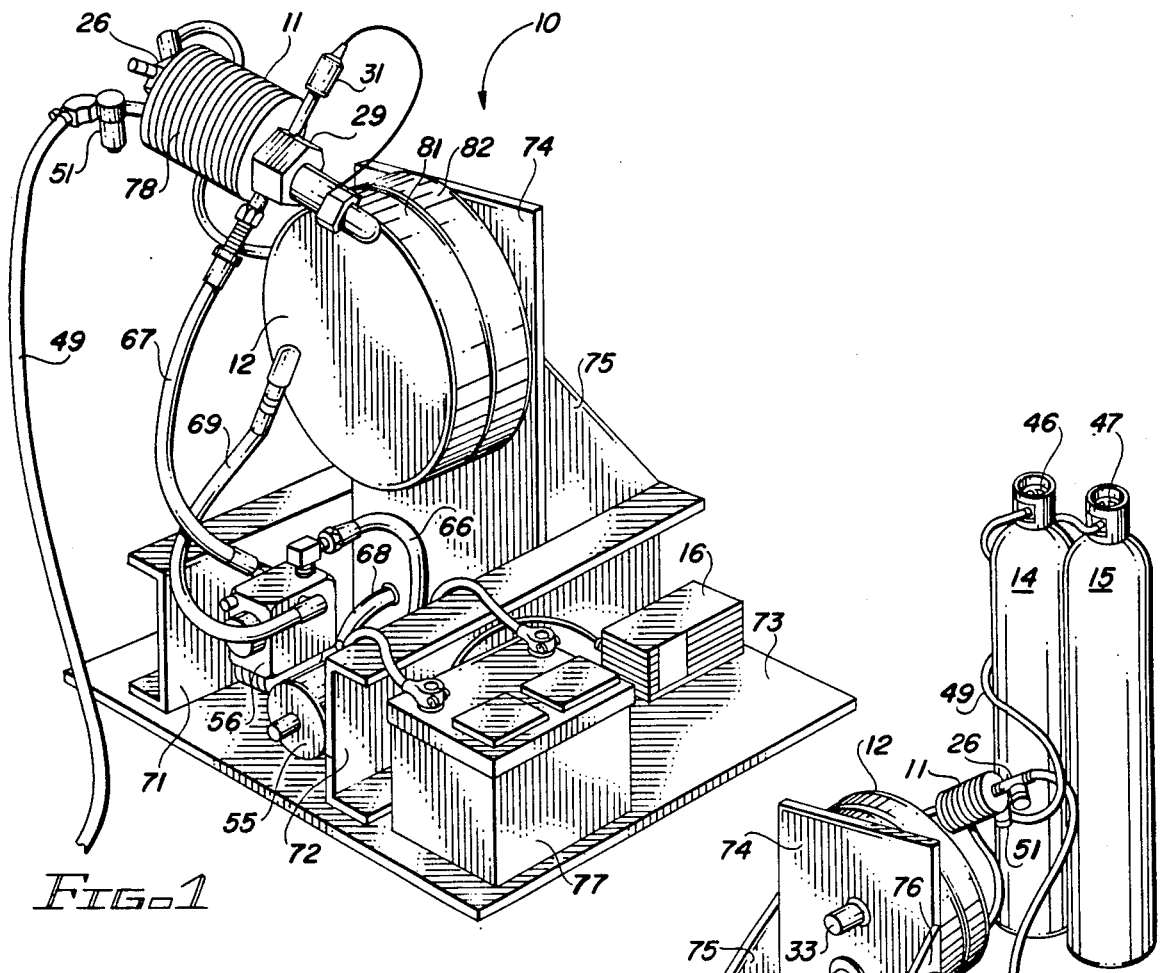
Fig.-1
Fig.-2
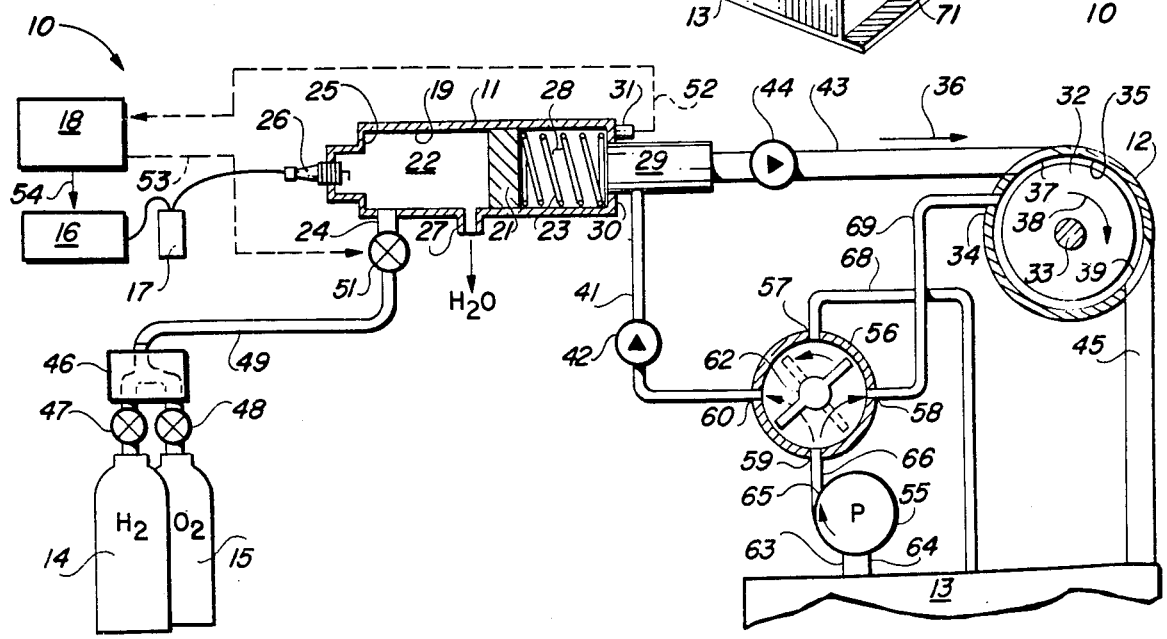
Fig.-3

4,777,801

ENERGY CONVERSION APPARATUS

BACKGROUND OF THE INVENTION

There is a continuing need for improved apparatus for use in the development of mechanical or electrical energy from fuels. Some of the more important requirements or considerations include the use of nonpolluting or "clean" fuels, low initial equipment costs, and the realization of a long and trouble-free service life for the conversion equipment.

In recent years, the smog problems that have troubled our larger cities have added a new emphasis to the need for reducing pollution. While the burning of most natural fuels produces harmful oxides and other contaminants, hydrogen gas stands out as a "clean" fuel because its only combustion product is water.

An obvious means for developing rotational mechanical energy from hydrogen is a gas turbine in which the burning hydrogen gas directly drives a turbine wheel. The high temperatures thus produced at the turbine blades, however, are not consistent with a long life for the turbine. While there are materials that can tolerate such high temperatures, their use in turbine construction is generally quite expensive.

Reciprocating internal combustion engines are more tolerant of high operating temperatures, but they have the disadvantage of requiring a crankshaft when rotational energy is desired. The need for a crankshaft adversely affects both initial cost, operating life and cost of maintenance.

The present invention capitalizes upon the indivdual merits of the reciprocating engine and the turbine engine while eliminating the main disadvantages of each.

PRIOR ART

U.S. Pat. No. 4,428,198 discloses a hydraulic device for converting reciprocating piston motion into rotation of a turbine shaft. The piston of this patent ejects hydraulic fluid through a first opening against the vanes of a rotor. On the compression stroke of the piston, fluid is drawn into the cylinder through a second opening. During the power stroke, the fluid is ejected through the first opening.

The disclosure claimed herein differs from this patented structure in the means for returning the piston of the reciprocating engine during the compression stroke and different means are used herein for filling the cylinder structure with fluid on the pumping end of the stroke.

Further, the patented structure synchronizes its combustion engine with its turbine while the combustion engine and turbine of this disclosure run at their own speeds.

U.S. Pat. No. 1,093,280 discloses a power generator in which the power of a reciprocating engine employing two cylinders is converted to continuous rotary motion. This patented structure employs a separate cylinder and piston as a pump with the piston of the pumping cylinder being coupled to the piston of the engine.

U.S. Pat. No. 3,757,515 discloses a piston drive engine in which a spring means urges the pistons against the combustion end of a chamber. This patent does not utilize a fluid for driving a turbine as claimed herein. The exploding gases in this patent are expelled directly against the vanes of a turbine to turn the turbine wheel.

U.S. Pat. No. 4,086,878 discloses a reciprocating piston internal combustion engine operating with hydrogen injection.

U.S. Pat. No. 3,608,529 discloses an air-pollution free internal combustion engine having hydrogen, oxygen and water spray injectors.

U.S. Pat. Nos. 3,946,711 and 4,140,090, although of interest, are not believed to be pertinent to this disclosure.

SUMMARY OF THE INVENTION

In accordance with the invention claimed, an improved apparatus is provided for the conversion of a nonpolluting fuel into rotational mechanical energy. The apparatus incorporates a turbine in such a way that the turbine blades are isolated from the high combustion temperatures of the fuel. A long and trouble-free operating life is thus expected for the turbine.

It is, therefore, an object of the present invention to provide a new and improved apparatus for the conversion of fuel into rotational mechanical energy.

Another object of this invention is to provide such an apparatus for which the preferred fuel is a nonpolluting type such as hydrogen gas.

A further object of this invention is to provide such an apparatus in a form not requiring a crankshaft, the elimination of the crankshaft being achieved through the incorporation of a turbine.

A still further object of this invention is to incorporate a turbine in a manner that isolates the turbine from the high combustion temperatures of the burning fuel, thereby promoting a long and trouble-free operating life for the turbine while not requiring the use of expensive materials and construction for the turbine blades.

A still further object of this invention is to achieve the isolation of the turbine blades from the high combustion temperatures through the use of an intermediate fluid that is supplied under pressure to the turbine by an internal combustion engine driving a spring biased piston, the piston acting as a pump for the delivery of the intermediate fluid to the turbine.

A still further object of this invention is to provide such an apparatus in a simple and inexpensive form.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWING

The present invention may be more readily described with reference to the accompanying drawing, in which:

FIG. 1 is a perspective view of the energy conversion apparatus of the invention as seen from the front;

FIG. 2 is a perspective view of the energy conversion apparatus of the invention as seen from the rear; and FIG. 3 is a functional diagram of the energy conversion apparatus of the invention.

DESCRIPTION OF THE PREFERRED EMBODIMENT

Referring more particularly to the drawing by characters of reference, FIGS. 1-3 disclose an energy conversion apparatus 10 of the invention comprising a reciprocating engine 11, a turbine 12, a reservoir 13, a hydrogen tank 14, an oxygen tank 15, an electronic ignition device 16 with an associated ignition coil 17 and a controller 18.

As shown most clearly in FIG. 3, reciprocating engine 11 comprises a cylinder 19, piston 21, combustion chamber 22 at one end of cylinder 19 and a compression spring 23 at the opposite end of cylinder 19, with piston 21 operating intermediate combustion chamber 22 and spring 23.

A mixture of hydrogen and oxygen enters combustion chamber 22 via a fuel entry port 24 located near the compression end 25 of cylinder 19. An automotive spark plug 26 is also mounted in end 25 of cylinder 19. An exhaust port 27 is provided near the center of cylinder 19 where it is cleared by piston 21 at the end of its expansion or power stroke.

The end of cylinder 19 that holds spring 23 constitutes a fluid drive chamber 28 with a fluid drive port 29 at its end wall 30. Also mounted in end wall 30 is a pressure sensor 31.

Turbine 12 comprises a turbine wheel 32 rotationally supported upon an axle 33 within a housing 34.

Wheel 32 has blades or vanes 35 distributed about its periphery. Blades 35 are driven by fluid 36 that enters housing 34 tangentially via a fluid entry port 37, the force of the fluid causing wheel 32 to rotate in the direction of arrow 38. Fluid 36 leaves turbine 12 via a fluid exhaust port 39.

Reservoir 13 holds a supply of fluid 36, which is preferably of the type employed in the transmission of an automobile.

Fluid from reservoir 13 is supplied to fluid drive port 29 and chamber 28 by way of a fluid delivery line 41. A check valve 42 connected in series with line 41 permits the passage of fluid from reservoir 13 to port 29, but blocks flow in the reverse direction.

A fluid drive line 43 carries fluid 36 from port 29 of chamber 28 to port 37 of turbine 12. A check valve 44 connected in series with line 43 permits fluid flow from cylinder 19 to turbine 12, but blocks flow in the opposite direction.

A fluid return line 45 carries fluid 36 from port 39 of turbine 12 back to reservoir 13.

Hydrogen and oxygen gas are contained under pressure in tanks 14 and 15, respectively. From tanks 14 and 15, the hydrogen and oxygen gases pass into a mixing chamber 46. The ratio of hydrogen to oxygen is controlled by two valves, a first valve 47 controlling the flow of hydrogen and a second valve 48 controlling the flow of oxygen.

From mixing chamber 46, the hydrogen and oxygen mixture is carried by a fuel line 49 to fuel entry port 24 of cylinder 19. A fuel injection solenoid valve 51 connected in series with line 49 blocks or passes the hydrogen and oxygen mixture, depending upon its state of energization.

Ignition device 16 and coil 17 are connected to fire spark plug 26 at appropriate intervals.

Controller 18 monitors pressure sensor 31 and responds accordingly by providing at appropriate intervals the necessary control signals to ignition device 16 and fuel injection valve 51.

Operation of this apparatus 10 occurs as follows:

At the beginning of each operating cycle, spring 23 has been compressed by the power stroke of the previous cycle, which has driven piston 21 to the right as shown in FIG. 3. As spring 23 now begins to return piston 21, driving it leftward, the pressure of the fluid surrounding spring 23 in chamber 28 falls from a positive level toward zero. Zero pressure is reached very quickly, and is sensed by pressure sensor 31. The zero pressure signal 52 from sensor 31 is transmitted to controller 18, which reacts instantaneously by dispatching a control signal 53 to solenoid valve 51, causing valve 51 to open so that a charge of the hydrogen and oxygen fuel mixture is admitted from line 49 into chamber 22.

During the injection of the fuel mixture, spring 23 moves piston 21 leftward so that a negative pressure builds in chamber 28. The negative pressure causes fluid to be drawn from reservoir 13 through line 41 and valve 42 into port 29 and chamber 28.

The controller 18, meanwhile, has been conducting a timing and control cycle that was initiated at the occurrence of the zero pressure signal. At the termination of a first period of time when sufficient time has been allowed for fuel injection, solenoid valve 51 is closed. Additional time is then allowed for piston 21 to complete its return. At the end of this period, controller 18 dispatches a spark enable signal 54 to ignition device 16. Device 16 responds immediately and in cooperation with coil 17 fires spark plug 26.

With the firing of plug 26, the hydrogen and oxygen mixture in chamber 22 is ignited. The resulting combustion of the hydrogen gas as it combines with the oxygen to form water vapor, produces a rapid pressure buildup within chamber 22 that drives piston 21 toward the right.

As piston 21 moves to the right, compressing spring 23, the fluid that had been drawn into chamber 28 is expelled through port 29, valve 44 and line 43 into turbine 12 via port 37. As fluid 36 impinges upon vanes 35, its kinetic energy is transferred to turbine wheel 32. Its energy thus expended, fluid 36 exits turbine 12 at port 39 and returns to reservoir 13 via line 45. During the foregoing power stroke, valve 42 blocks fluid flow from port 28 into line 41 so that all the fluid expelled from chamber 28 is forced to pass through turbine 12. The energy transferred to wheel 32 of turbine 12 is, of course, available at shaft 33 to drive a load which might comprise an electrical generator.

In a first implementation of the invention, it was found necessary to purge the air from chamber 28, and to initiate the rotation of turbine wheel 32 prior to initiating the operation of reciprocating engine 11. For these purposes, a starting pump 55 and a four-way hydraulic valve 56 were incorporated in apparatus 10, as shown in FIG. 3.

Valve 56 has four ports, 57-60 positioned, respectively, at four quadrants, as shown. An internal gate member 62 has two positions, including a "start" position, and a "purge" position. The "start" position is shown by the solid line representation of member 62, while the "purge" position is shown in broken lines. In the "start" position, ports 58 and 59 communicate with each other, and ports 57 and 60 communicate with each other while communication between port 58 or 59 with port 57 or 60 is blocked. In the "purge" position, ports 57 and 58 communicate with each other and ports 59 and 60 communicate with each other while neither port 57 or 58 is in communication with either port 59 or 60.

Pump 55 has its intake port 63 connected by a line 64 to reservoir 13. Its exhaust port 65 is connected by a line 66 to port 59 of valve 56.

Port 60 of valve 56 is connected by a line 41 to port 29 of cylinder 19, port 57 of valve 56 is connected by a line 68 to reservoir 13, and port 58 of valve 56 is connected by a line 69 to another port of turbine 12.

The start-up operation involving pump 55 and valve 56 proceeds as follows. With member 62 of valve 56 initially set in the "purge" position, pump 55 is operated to draw fluid from reservoir 13 via line 64, driving it through line 66 to valve 56. The fluid enters port 59 of valve 56, exits at port 60, passes through line 41 into port 29. The fluid entering port 29 fills chamber 28, driving contained air ahead of its flow as it proceeds from port 29 through valve 44, line 43 and turbine 12 and returns through line 45 to reservoir 13.

When sufficient time has been allowed for the removal of air from chamber 28, turbine 12 and the associated fluid lines, as just described, member 62 of valve 56 is set to the "start" position. Now, the fluid supplied by pump 55 to port 59 exits valve 56 at port 58, taking line 69 to a port of turbine 12 where the fluid impinges upon vanes 35 of wheel 32, initiating rotation of wheel 32. When sufficient rotational velocity is achieved, as indicated by a tachometer (not shown in the drawing) that monitors rotation of shaft 33, the normal operation of the reciprocating engine 11 is initiated by controller 18.

A first implementation of the energy conversion apparatus 10 of the invention is shown in FIGS. 1 and 2. Two steel channels 71 and 72, secured to a steel plate or wooden platform 73, serve as a support for the apparatus. Reservoir 13 is in the form of a closed rectangular compartment, positioned between the channels 71 and 72, at the rear of the apparatus 10. Turbine 12 is secured to a vertical steel plate 74. Plate 74 is supported by two triangular brackets 75 and 76 that rest atop channels 72 and 71, respectively. Engine 11 is supported by its attachment to turbine 12. The electronic ignition 16 and an automotive battery 77 which supplies electrical power to pump 55, ignition 16 and control 18 are mounted along the outside of channel 72. Ignition coil 17 is mounted at the outside surface of bracket 76. Fluid return line 45, as shown in FIG. 2, passes through plate 74 at the lower edge of turbine 12 and turns downward to enter the top cover of reservoir 13. The output shaft 33 also extends through plate 74. Pump 55 and valve 56 are mounted on plate 73 between channels 71 and 72 directly below turbine 12.

Reciprocating engine 11 has a finned outer shell 78 which aids in the dissipation of the heat produced by the burning hydrogen.

Turbine 12 has two disc-shaped sections 81 and 82. Forward section 81 houses turbine wheel 32, and rearward section 82 serves as a splash plate that collects the fluid as it leaves vanes 35 and carries it to fluid exhaust port 39.

In accordance with the stated objects of the invention, the nonpolluting fuel hydrogen is converted to mechanical energy in reciprocating engine 11. Transmission fluid 36 serves as a medium for the transfer of the mechanical energy developed by engine 11 to turbine 12 which makes it available at shaft 33 as rotational energy for use in driving an electrical generator or other load. The transmission fluid may readily be held at a relatively low temperature so that a long life and low maintenance costs may be assured for turbine 12.

Although but a single embodiment of the invention has been illustrated and described, it will be apparent to those skilled in the art that various changes and modifications may be made therein without departing from the spirit of the invention or from the scope of the appended claims.

What is claimed is:

1. An energy conversion apparatus comprising:
   an engine,
   said engine comprising a cylinder and a piston reciprocally mounted therein,
   said cylinder defining a combustion chamber on one side of said piston for receiving a fuel mixture and a fluid drive chanber on the other side of said piston for receiving hydraulic fluid,
   a turbine,
   said turbine comprising a housing and a vaned turbine wheel rotatably mounted on a drive shaft journalled in said housing,
   hydraulic means for coupling fluid in said fluid drive chamber of said cylinder with said housing for rotatably driving said turbine wheel and said drive shaft upon a given movement of said piston,
   means for providing said combustion chamber of said engine with a fuel mixture comprising hydrogen and oxygen,
   an ignition means for selectively igniting said mixture in said combustion chamber, and
   purging means for selectively rotating said turbine prior to ignition of said fuel mixture in said engine to remove air therefrom,
   said purging means comprising a pump means for moving fluid from said reservoir into said fluid drive chambers, said conduit means and said turbine housing,
   whereby said piston driven by the ignited fuel mixture forces fluid in said fluid drive chamber against the vanes of said turbine wheel to rotate said drive shaft.

2. The energy conversion apparatus set forth in claim 1 wherein:
   said engine comprising a spring mounted in said fluid drive chamber for biasing said piston toward the combustion chamber of said cylinder upon completion of said given movement of said piston, and
   a spark plug comprising a part of said ignition means mounted on said cylinder and communicating with said combustion chamber.

3. The energy conversion apparatus set forth in claim 2 in further combination with:
   a reservoir for containing a supply of hydraulic fluid,
   said housing containing an inlet port and an outlet port, and
   conduit means for connecting said fluid drive chamber to said inlet port, said outlet port to said reservoir and said reservoir to said fluid drive chamber in a closed loop circle.

4. The energy conversion apparatus set forth in claim 3 in further combination with:
   check valves, one mounted in said conduit means connecting said fluid drive chamber to said inlet port, and another mounted in said conduit means connecting said reservoir to said fluid drive chamber,
   whereby fluid can only move one way from said fluid drive chamber to said inlet port and from said reservoir to said fluid drive chamber.

* * * * *